US011955072B2

(12) United States Patent
Kim et al.

(10) Patent No.: US 11,955,072 B2
(45) Date of Patent: Apr. 9, 2024

(54) OLED-BASED DISPLAY HAVING PIXEL COMPENSATION AND METHOD

(71) Applicant: eMagin Corporation, Hopewell Junction, NY (US)

(72) Inventors: Seonki Kim, Fishkill, NY (US); Amalkumar P. Ghosh, Hopewell Junction, NY (US); Olivier Prache, Pleasantville, NY (US); Hyuk Sang Kwon, Sunnyvale, CA (US)

(73) Assignee: eMagin Corporation, Hopewell Junction, NY (US)

( * ) Notice: Subject to any disclaimer, the term of this patent is extended or adjusted under 35 U.S.C. 154(b) by 71 days.

(21) Appl. No.: 17/830,912

(22) Filed: Jun. 2, 2022

(65) Prior Publication Data

US 2022/0398959 A1 Dec. 15, 2022

Related U.S. Application Data

(60) Provisional application No. 63/209,215, filed on Jun. 10, 2021.

(51) Int. Cl.
*G09G 3/3225* (2016.01)

(52) U.S. Cl.
CPC ... *G09G 3/3225* (2013.01); *G09G 2320/0285* (2013.01); *G09G 2320/029* (2013.01); *G09G 2320/045* (2013.01); *G09G 2360/145* (2013.01)

(58) Field of Classification Search
CPC ......... G09G 3/3225; G09G 2320/0285; G09G 2320/029; G09G 2320/045; G09G 2360/145; G09G 2330/12
See application file for complete search history.

(56) References Cited

U.S. PATENT DOCUMENTS

| | | | |
|---|---|---|---|
| 7,321,348 | B2 | 1/2008 | Cok et al. |
| 2005/0110420 | A1 | 5/2005 | Arnold et al. |

(Continued)

FOREIGN PATENT DOCUMENTS

| | | |
|---|---|---|
| CN | 205751477 | 11/2016 |
| CN | 109417130 | 3/2019 |
| WO | 2022/260967 | 12/2022 |

OTHER PUBLICATIONS

English Translation of Search Report issued in Taiwanese Patent Application No. 111121712 dated Jun. 27, 2023.

(Continued)

*Primary Examiner* — Amit Chatly
(74) *Attorney, Agent, or Firm* — Kaplan Breyer Schwarz, LLP

(57) ABSTRACT

An OLED display system is provided having visual performance pixel compensation for loss of brightness, including display pixels, where each display pixel has OLED subpixels and pixel drive circuitry; a sensing system having sensors and analog to digital conversion circuitry connected to each of the sensors, and a processor to provide an image data drive signal to each of the display pixels, receive the sensor signal from the ADC circuitry for each sensor, estimate a state of degradation of at least one of the display pixels, determine a drive-signal compensation for each display pixel having an estimated state of degradation and compensate the image data drive signal to each display pixel having an estimated state of degradation. Methods for compensating pixels for an image in a display are also provided.

8 Claims, 4 Drawing Sheets

(56) References Cited

U.S. PATENT DOCUMENTS

| | | | | |
|---|---|---|---|---|
| 2008/0218453 | A1 | 9/2008 | Miyamoto et al. | |
| 2014/0320553 | A1* | 10/2014 | Eom | G09G 3/3208 345/77 |
| 2016/0163261 | A1 | 6/2016 | Kim et al. | |
| 2018/0018940 | A1 | 1/2018 | Biebersdorf et al. | |
| 2020/0105851 | A1 | 4/2020 | Yazdandoost et al. | |
| 2020/0372861 | A1* | 11/2020 | Ok | G09G 3/3233 |
| 2021/0097943 | A1* | 4/2021 | Wyatt | H10K 59/351 |

OTHER PUBLICATIONS

Matthew Hartensveld, "Fully Monolithic GaN μLED Display System", SID Society for Information Display, Jun. 28, 2021, pp. 880-883, vol. 52, Issue 1, https://doi.org/10.1002/sdtp.14825.

Authorized Officer Shane Thomas, International Search Report and Written Opinion issued in PCT Patent Application No. PCT/US2022/032240 dated Dec. 2, 2022.

* cited by examiner

OLED-BASED DISPLAY HAVING PIXEL COMPENSATION AND METHOD

CROSS REFERENCE TO RELATED APPLICATION

This application claims priority to U.S. Provisional Patent Application No. 63/209,215, entitled OLED-Based Display Having Pixel Compensation and Method, filed Jun. 10, 2021, pending, the complete specification of which is fully incorporated by reference herein.

BACKGROUND OF THE INVENTION

The present invention relates to image display technology and, more particularly, to visual-performance compensation of organic light-emitting diode (OLED) pixels within an OLED-based display.

Organic Light-Emitting Diode (OLED) displays include an array of pixels, each of which typically includes at least one OLED for providing light. Each OLED includes a light-emitting layer (or multiple sub-layers) of a luminescent organic material that is located between a cathode and an anode. In response to an electrical signal applied to the cathode and anode, the luminescent organic material emits light. By applying an appropriate drive signal to the pixels, a desired image is produced by the display.

As is well-known to one skilled in the art, as usage time accrues for an OLED element, it suffers degradation that manifests as loss of brightness. As a result, a variation in the brightness of the OLED-based pixels across a display will arise over time, due to differences in the amount of stress each is subjected to over time, as well as the accumulated duration of that stress. For example, in some cases, some OLEDs within a display are under more stress than others due to fixed symbology, patterns or icons. Unfortunately, the locations and severity of the degradation among the pixels cannot be identified without sensing individual pixels.

Compensating degradation of pixel brightness in an OLED display is challenging, however, due to intrinsic signal characteristics, such as small electrical amplitude of nano-Ampere ranges (nA) in a typical pixel driving circuit. Further complicating the matter, the amount of space available in the pixel regions is limited—particularly for high-density displays used, for example, microdisplays in near-eye applications such as augmented reality (AR) and virtual reality (VR) devices (e.g., micro displays having more than a couple of thousands of dots per inch). Typically, these pixel regions are already space-limited due to the high density of electrical components (e.g., transistors, capacitors, etc.) they require. As a result, adding extra components for pixel compensation without negatively impacting overall signal integrity or manufacturing yields is difficult, if not impossible.

Conventional approaches for visual-performance compensation employ sensing units built into the display backplane in regions outside the active-pixel region (i.e., display region) of the display. One exemplary approach includes placing a reference pixel (or more than one) on the substrate of the active pixel array just outside the display region. A voltage change across the reference pixel is measured and used to compensate pixels within the display region according to the measured change. Such approaches are described, for example, in U.S. Pat. No. 7,321,348 (Cok et al.), which is fully incorporated herein by reference.

Another exemplary prior-art approach for compensation includes measuring the initial state of each active pixel in the display region, measuring its current value via a feedback loop on the backplane of the system and storing it in memory. A resistance change corresponding to OLED degradation can be determined by observing current feedback and used to set a compensation level for each OLED. Such approaches are described, for example, in U.S. Patent Publ. No. 2005/0110420 (Arnold et al.), which is fully incorporated herein by reference.

Unfortunately, such prior-art compensation approaches are insufficient for many applications and significantly increase the cost and complexity of a display and its backplane technology.

The need for providing visual-performance compensation in an OLED-based display in a practical, low-cost manner remains, as yet, unmet in the prior art.

SUMMARY OF THE INVENTION

The present disclosure is directed to visual-performance compensation of OLED-based displays in a manner that does not impact the active pixel area in the backplane of the display. Compensation is realized using sensing devices that are external to the backplane and a compensation method for detecting degradation, and the degree to which it has occurred. As a result, the teachings herein enable improved visual-performance compensation without the use of backplane silicon area.

An illustrative embodiment comprises a plurality of sensor devices located near the OLED emission area, where the sensors are configured to detect the brightness from the emission window. An initial luminance is determined for each pixel, after which a set of fixed-pattern images is projected by the display. The sensors detect a difference in brightness among the pixels enabling identification of pixels whose brightness has decreased from their initial value. Compensation is applied to degraded pixels by an input processing unit at the next on/off sequence.

In some embodiments, a test image that includes the output of multiple pixels is generated by the display. The method begins by determining the number of non-degraded pixels that turns on the sensor beyond a threshold luminance. The sensor output can be one of electrical parameters such as voltage and is recorded for the threshold luminance. Accordingly, the number of pixels and the corresponding output are recorded in the operational region of the sensor. Typically, degraded pixels are positioned on the symbology or icons and suffering the same aging stress, while normal pixels are not on the symbology. The method continues with grouping the same number of degraded pixels first and adding one degraded pixel at a time until reaching the threshold luminance. The number of degraded pixels is then recorded. If the number of degraded pixels is not enough to turn on the threshold luminance, good pixels are added until reaching the threshold luminance. If good pixels are mixed with degraded ones in the test image, a proportional method can be used to decide the sensor output only from the degraded pixels. The difference between the reference and the degraded pixels is determined, and the difference is divided by the number of degraded pixels. As a result, a relative level of degradation for each pixel is estimated. The level of degradation and the location of the degraded pixels are then sent to an input processing unit for adjustment of the input level of each pixel (i.e., compensation).

In some cases, the test image comprises the output of a single pixel.

The choice of whether one pixel, or more than one pixel, is used in the test image is typically based on the sensitivity of the photodetector or photodetectors. Methods in accordance with the present disclosure have the flexibility to mitigate the difference in sensitivity. If degradation of a single pixel is detected by the sensor, a test image can consist of a single pixel.

In a first exemplary embodiment of the present invention, an organic light-emitting diode (OLED) display system having visual performance pixel compensation for loss of brightness is provided. The display system includes a plurality of display pixels, each display pixel comprising a plurality of OLED subpixels and pixel drive circuitry; a sensing system including a plurality of sensors and analog to digital conversion (ADC) circuitry operatively connected to each of the sensors, the ADC circuitry providing a sensor signal for each of the sensors. A processor is provided to provide an image data drive signal to each of the display pixels, receive the sensor signal from the ADC circuitry for each sensor, estimate a state of degradation of at least one of the display pixels, determine a drive-signal compensation for each display pixel having an estimated state of degradation, and compensate the image data drive signal to each display pixel having an estimated state of degradation based on the drive-signal compensation for each display signal having an estimated state of degradation.

The processor may include hardware that is local to the display system. The processor may include firmware that is local to the display system. The sensors may be optical sensors such as photo detectors. The sensors may be arranged around a perimeter defined by the display pixels. An area outside of the perimeter defined by the display pixels may be a backplane, wherein the sensors are in the backplane. Each of the sensors may be oriented orthogonally to a plane of a substrate of the plurality of pixels.
The image data signal may provide a test image.

In a second exemplary embodiment of the present invention, a method of compensating at least one pixel for an image in a display, is provided. The method includes the steps of storing a pixel map for a display area of the display, the pixel map having a plurality of non-degraded pixels and at least one degraded pixel, projecting at least one fixed pattern on the display area, determining a number ($N_O$) of non-degraded pixels required to turn on a sensing system, wherein the number of non-degraded pixels have a luminescence beyond a threshold luminescence sufficient to turn the sensing system on, setting a count value (i) to zero, generating a symbol S by energizing a number of degraded pixels equal to i and measuring a luminescence output of the sensing system to determine whether the sensing system is on. If the sensing system is not turned on, the method continues with the step of adding one to i, and re-generating S by energizing one additional degraded pixel. If the sensing system turns on, the method continues with the step of determining a degradation level based on $N_O$ and S, updating the pixel map based on a current value of S and the degradation level, and generating image data for forming a compensated image in the display.

The sensor output may be a voltage. The degradation level may be determined by the formula $(i/N_O)\times 100\%$.

The one fixed pattern may include a test pattern of a single pixel.

In a third exemplary embodiment of the present invention, a method of compensating at least one pixel for an image in a display is provided. This method includes the steps of storing a pixel map for a display area of the display, the pixel map having a plurality of non-degraded pixels and at least one degraded pixel, projecting at least one fixed pattern on the display area, determining a number ($N_O$) of non-degraded pixels required to turn on a sensing system, wherein the number of non-degraded pixels have a luminescence beyond a threshold luminescence sufficient to turn the sensing system on, and determining a number ($N_1$) of degraded pixels present in the stored pixel map. The method continues with the steps of setting a count value (i) to zero and generating a symbol S by energizing an initial number of degraded pixels. Next, the method continues with the step of measuring a luminescence output of the sensing system to determine whether the sensing system is on. If the sensing system is not turned on at step, one is added to the count value i, and S is re-generated by energizing one additional degraded pixel, and the method goes back to the step of measuring. If the sensing system turns on, the method continues with the step of determining a degradation level based on $N_O$ and a current value of S. Finally, the method continues with the steps of updating the pixel map based on S and the degradation level, and generating image data for forming a compensated image in the display.

The sensor output may be voltage. The degradation level may be determined by the formula $((N_1-(No-i))/(N_0-i))\times 100\%$. The fixed pattern may be a test pattern of a single pixel.

DETAILED DESCRIPTION

Figure 1:
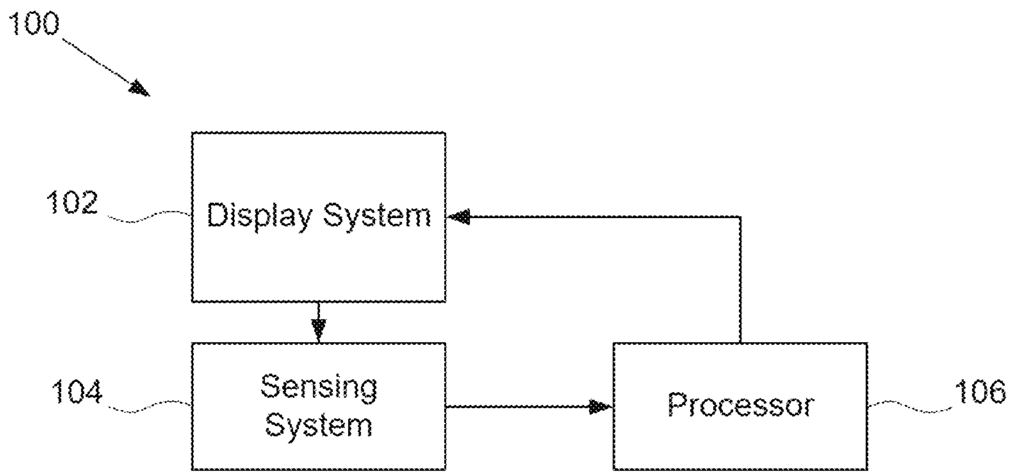
FIG. 1 depicts a schematic drawing of the salient features of an image-rendering system in accordance with an exemplary embodiment of the present invention.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the figures comprising the drawing are not drawn to scale.

FIG. 1 depicts a schematic drawing of the salient features of an image-rendering system in accordance with the present disclosure. Display 100 includes display system 102, sensing system 104, and processor 106.

Display system 102 includes a plurality of display pixels, each of which contains a plurality of OLED-based sub-pixels, pixel-drive circuitry, and associated system electronics.

Sensing system 104 includes a plurality of sensors and analog-to-digital conversion (ADC) circuitry that is operatively coupled with the sensors.

Processor 106 is preferably an external processor configured to do at least some of: provide image data to display system 102; receive sensor signals from the ADC circuitry; run programs and store data; perform software routines for estimating the health (i.e., state of degradation) of one or more OLEDs in display area 202; determine suitable drive-signal compensation for the OLEDs; and compensate the image data accordingly to provide the compensated drive signals to their corresponding display pixels. In the depicted example, processor 106 is incorporated into an image processing system, which is typically used to drive a conventional display. In some embodiments, however, processor 106 includes hardware and/or firmware that is local to the display system and/or sensing system. In some embodiments, it is preferable that methods for determining the required compensation are integrated into the firmware of a display.

Figure 2:
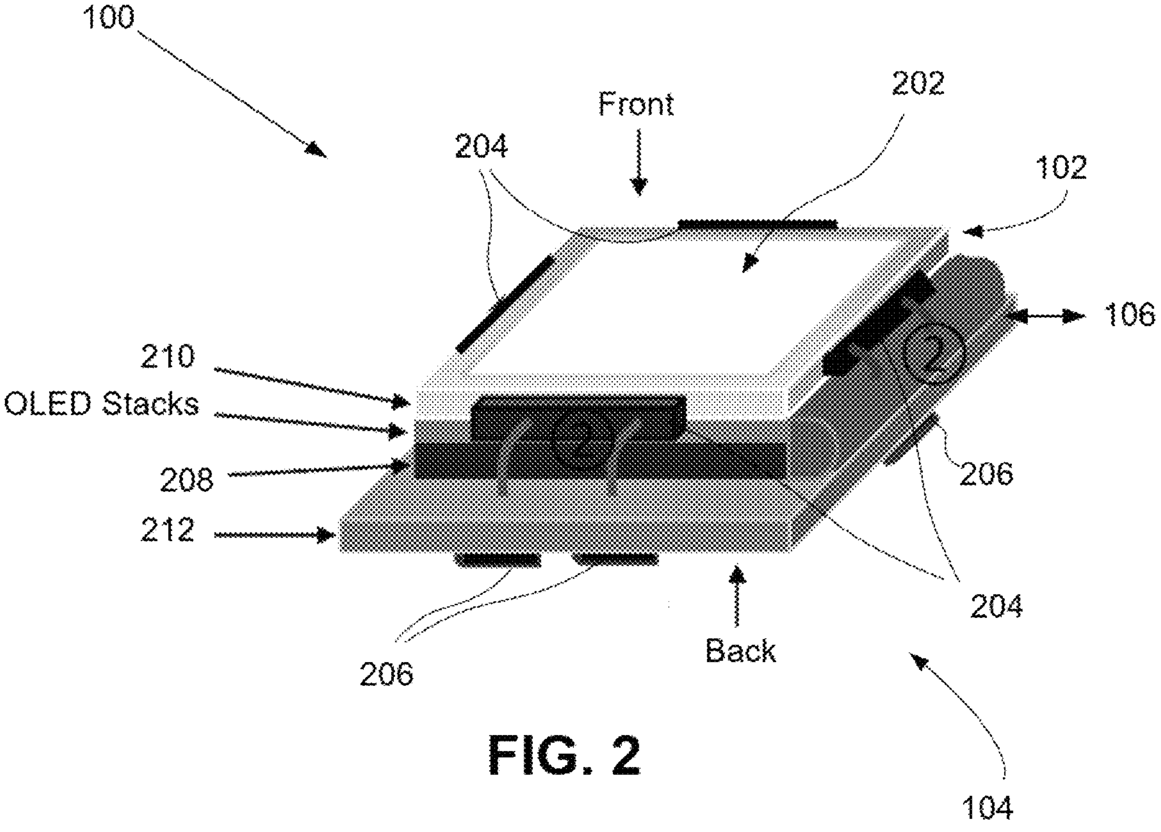
FIG. 2 depicts a schematic drawing of a more detailed perspective view of a portion of a display of FIG. 1.

FIG. 2 depicts a schematic drawing of a more detailed perspective view of a portion of display 100.

Display system 102 includes display region 202, which is the region of the display in which images are generated by emission of light from the plurality of OLED-based pixels. Display region 202 (also referred to as the "active OLED pixel area") comprises a plurality of display pixels, each of which includes at least one OLED and its associated pixel-drive circuitry, as well as any other associated electronic circuitry.

The plurality of OLEDs and their associated drive circuitry are located on substrate 208, which defines the backplane of display region 202. The display area is covered by cover glass 210 and substrate 208 is disposed on the front surface of carrier board 212.

Sensing system 104 includes sensors 204 and analog-to-digital conversion (ADC) circuitry 206.

Sensors 204 are conventional optical sensors that are arranged around the perimeter of display area 202. In the depicted example, each of sensors 204 is a conventional photodetector; however, any suitable sensor can be used in sensing system 104 without departing from the scope of the present disclosure. Sensors 204 are arranged such that their respective substrates are oriented orthogonally to the plane of substrate 208 and, as a result, they receive light from the OLEDs at the edges of cover glass 210. In some embodiments, cover glass 210 includes optical elements (e.g., diffractive optical elements, holograms, prisms, angled mirrors, etc.) for improving the ability of sensors 204 to sense the luminescence of one or more of the OLEDs of the display pixels. The sensors 204 may be external optical-to-electrical (OE) sensors which convert light intensity to electrical signals. The sensor location is at the edge of the cover glass 210.

ADC circuitry 206 comprises one or more conventional analog-to-digital converter circuits and associated additional components suitable for converting the output of sensors 204 into digital signals usable by processor 106.

As would be apparent to one skilled in the art, after reading this Specification, the luminance intensity of a single pixel (or sub-pixel) in a display can be too small to be measured by some sensors. It is an aspect of the present disclosure, however, that a test image can be generated by the display and used to determine which, if any, OLEDs in the display require compensation and how to compensate them. It should be noted that, in some cases, such an image can be limited to the output of only one pixel if the sensitivity of the sensor or sensors is sufficient. Furthermore, methods disclosed herein enable a learning process in which the number of pixels required in a test image can be experimentally determined over time.

Figure 3:
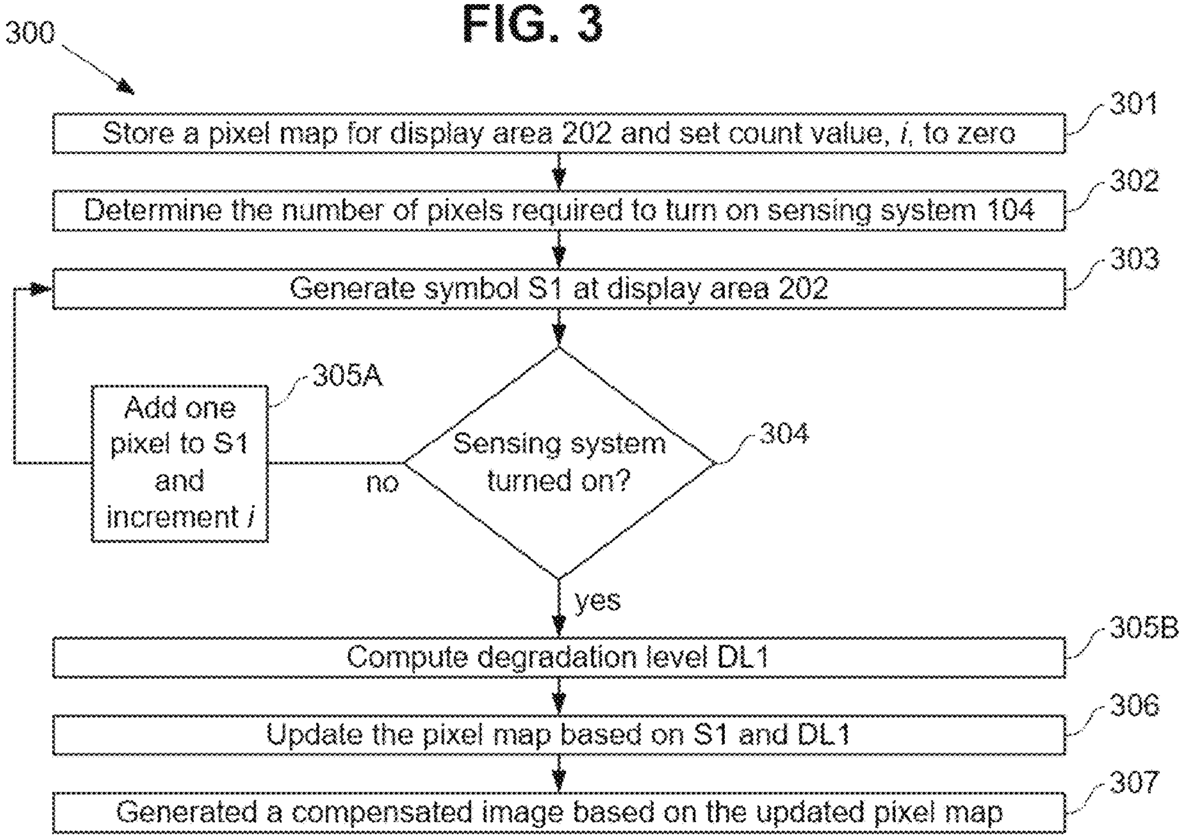
FIG. 3 depicts a flowchart of a first exemplary method for compensating one or more pixels in a display in accordance with the present invention.

FIG. 3 depicts operations of a first method for compensating one or more pixels in a display in accordance with the present disclosure. Method 300 begins with operation 301, wherein a pixel map for display area 202 is stored by processor 106 and a count value, i, is set to zero. The value of i is representative of the number of additional degraded pixels that must be added to symbol, S1, to turn sensing system 104 on, as discussed below.

At operation 302, the number of normal (non-degraded) pixels, $N_o$, required to turn on sensing system 104 based on its threshold luminance is determined. This value, as well as the corresponding output of sensor system 104 are then stored. In the depicted example, the output of sensor system 104 is a voltage; however, in some embodiments it is a different electrical parameter.

At operation 303, a symbol, S1, is generated using the same number (i.e., $N_o$) of degraded pixels. Typically, symbol S1 is designed such that it does not include non-degraded pixels and the degraded pixels it includes have suffered the same aging stress.

At operation 304, the output of sensing system 104 is measured to determine whether it has been turned on.

If sensing system 104 does not turn on in response to symbol S1, method 300 continues with operation 305A, wherein the symbol is augmented by energizing one additional degraded pixel, the value of i is incremented, and the method returns to operation 304.

If sensing system 104 turns on, method 300 continues with operation 305B, wherein a degradation level, DL1, for the pixels included in symbol S1 is determined based on the values of $N_o$ and i. In the depicted example, the degradation level is determined as:

$$D_L 1 = \frac{i}{N_0} \times 100\%.$$

For example, if 300 non-degraded pixels are required to turn sensing system 104 on, and symbol S1 requires 360 degraded pixels to be energized to turn the sensing system, then $N_o$=300 and i=60, giving DL1 as 20%.

At operation 306, the pixel map is updated based on S1 and DL1.

At operation 307, the updated pixel map is used to generated image data for forming a compensated image at the display.

In some embodiments of the present invention, a test image (i.e., symbol) includes both degraded and non-degraded pixels. In such cases, a proportional method can be used to compensate the display elements based primarily, or exclusively, on the degraded pixels. In such approaches, the difference between the reference and the degraded pixels is determined and then divided by the number of degraded pixels, giving a relative level of degradation for each pixel.

Figure 4:
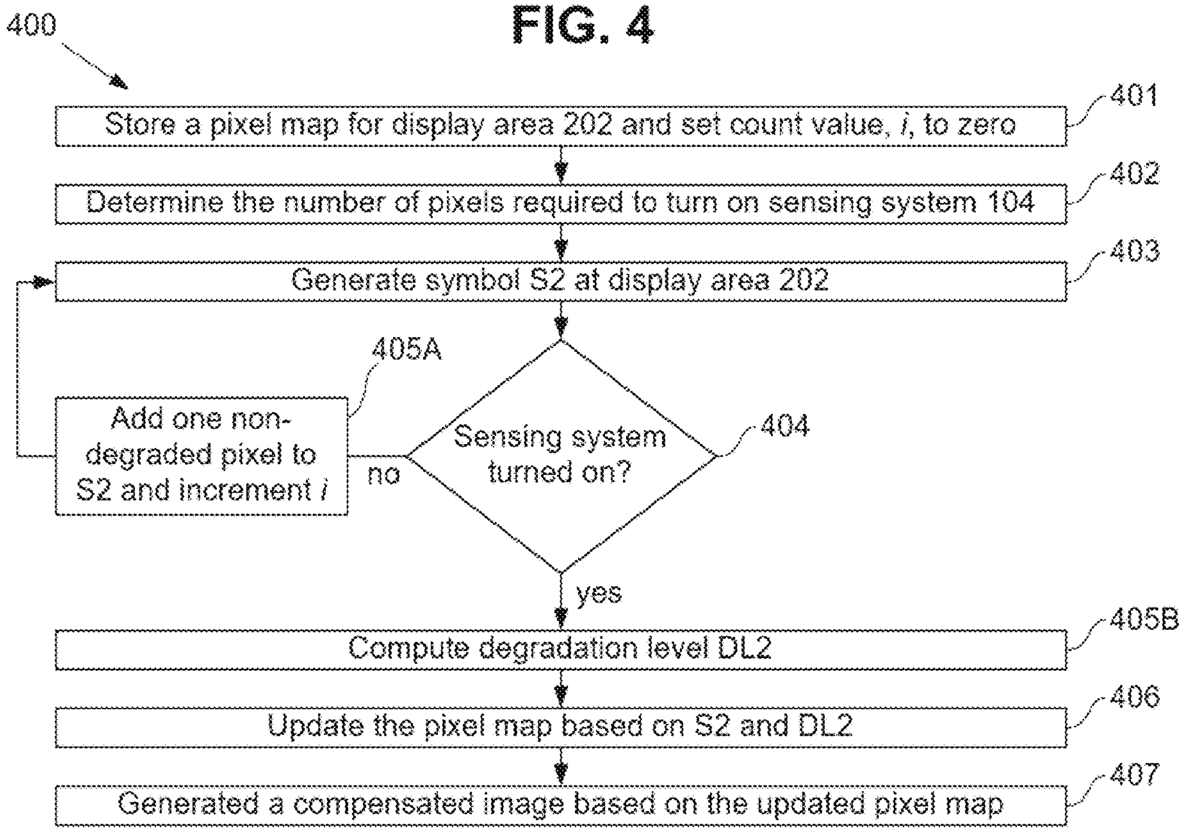
FIG. 4 depicts a flowchart of a second exemplary method for compensating one or more pixels in a display in accordance with the present invention.

FIG. 4 depicts operations of a first method for compensating one or more pixels in a display in accordance with the present disclosure. Method 400 begins with operation 401, wherein a pixel map for display area 202 is stored by processor 106 and count value, i, is set to zero.

At operation 402, the number of normal (non-degraded) pixels, $N_o$, required to turn on sensing system 104 based on its threshold luminance is determined. This value, as well as the corresponding output of sensor system 104 are then stored.

At operation 403, a symbol, S2, is generated using $N_1$ degraded pixels and the value of variable, i, is set to zero. In this example, the value of i is representative of the number of non-degraded pixels that must be added to symbol, S2, to turn sensing system 104 on, as discussed below.

At operation 404, the output of sensing system 104 is measured to determine whether it has been turned on.

If sensing system 104 does not turn on in response to symbol S2, method 400 continues with operation 405A, wherein symbol S2 is augmented by energizing one additional non-degraded pixel, the value of i is incremented, and the method returns to operation 404.

If sensing system 104 turns on, method 400 continues with operation 405B, wherein a degradation level, DL2, for the pixels included in symbol S2 is determined. In the depicted example, the degradation level is determined as:

$$D_L 2 = \frac{N_1 - (N_0 - i)}{N_0 - i} \times 100\%.$$

For example, if 300 non-degraded pixels are required to turn sensing system 104 on, and symbol S2 initially includes 250 degraded pixels but requires an additional 70 non-degraded pixels be energized to turn the sensing system, then $N_o$=300, $N_1$=250, and i=70, giving DL2 as 8.7%.

At operation 406, the pixel map is updated based on S2 and DL2.

At operation 407, the updated pixel map is used to generated image data for forming a compensated image at the display.

It is an aspect of the present invention that providing luminescence sensing that is external to display region 202 affords significant advantages over the prior art, such as:

i. avoiding additional components on the backplane of a display; or
ii. a wide range of sensors are suitable for use; or
iii. any practical electrical signal level can be used in the pixel driving circuit; or
iv. no reliance on the OLED emission stack or the topology of the pixel-drive circuitry in the backplane; or
v. the method is a learning process and has flexibility regarding the number of pixels compensated and the time at which compensation is determined; or
vi. addition or removal of the sensing capability can be implemented at any time; or
vii. compensation capability can be added to existing display systems, since it is external to the normal backplane configuration; or
viii. any combination of i, ii, iii, iv, v, vi, and vii.

Additional advantages may include:

i. no occupation of backplane silicon since implementation may be externally made;
ii. test image patterns can be changeable at any time;
iii. invention does not rely on OLED emission stack or topology of the pixel driving circuit in the backplane; and
iv. addition and removal of the implementation of the present invention is possible at any time.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of compensating at least one pixel for an image in a display, comprising the steps of:

(a) storing a pixel map for a display area of the display, the pixel map having a plurality of non-degraded pixels and at least one degraded pixel;
(b) projecting at least one fixed pattern on the display area;
(c) determining a number ($N_O$) of non-degraded pixels required to turn on a sensing system, wherein the number of non-degraded pixels have a luminescence beyond a threshold luminescence sufficient to turn the sensing system on;
(d) setting a count value (i) to zero;
(e) generating a symbol S by energizing a number of degraded pixels equal to i;
(f) measuring a luminescence output of the sensing system to determine whether the sensing system is on;
(g) if the sensing system is not turned on at step (f), adding one to i, and re-generating S by energizing one additional degraded pixel;
(h) if the sensing system turns on at step (f), determining a degradation level based on $N_O$ and S;
(i) updating the pixel map based on a current value of S and the degradation level; and
(j) generating image data for forming a compensated image in the display.

2. A method of compensating at least one pixel in a display of claim 1, wherein the sensor output is voltage.

3. A method of compensating at least one pixel in a display of claim 1, wherein the degradation level is determined by the formula:

$$(i/N_O)\times 100\%.$$

4. A method of compensating at least one pixel in a display of claim 1, wherein the at least one fixed pattern comprises a test pattern of a single pixel.

5. A method of compensating at least one pixel for an image in a display, comprising the steps of:

(a) storing a pixel map for a display area of the display, the pixel map having a plurality of non-degraded pixels and at least one degraded pixel;

(b) projecting at least one fixed pattern on the display area;

(c) determining a number ($N_O$) of non-degraded pixels required to turn on a sensing system, wherein the number of non-degraded pixels have a luminescence beyond a threshold luminescence sufficient to turn the sensing system on;

(d) determining a number ($N_1$) of degraded pixels present at step (a)

(e) setting a count value (i) to zero;

(f) generating a symbol S by energizing an initial number of degraded pixels;

(g) measuring a luminescence output of the sensing system to determine whether the sensing system is on;

(h) if the sensing system is not turned on at step (g), adding one to the count value i, re-generating S by energizing one additional degraded pixel, and continuing at step (f);

(i) if the sensing system turns on at step (g), determining a degradation level based on $N_O$ and a current value of S;

(j) updating the pixel map based on S and the degradation level; and (k) generating image data for forming a compensated image in the display.

6. A method of compensating at least one pixel in a display of claim 5, wherein the sensor output is voltage.

7. A method of compensating at least one pixel in a display of claim 5, wherein degradation level is determined by the formula:

$$((N_1-(N_O-i))/(N_0-i))\times 100\%.$$

8. A method of compensating at least one pixel in a display of claim 5, wherein the at least one fixed pattern comprises a test pattern of a single pixel.

* * * * *